April 27, 1965 F. D. PARKER 3,180,213
PORTABLE PROJECTION APPARATUS
Original Filed Aug. 24, 1959 2 Sheets-Sheet 1
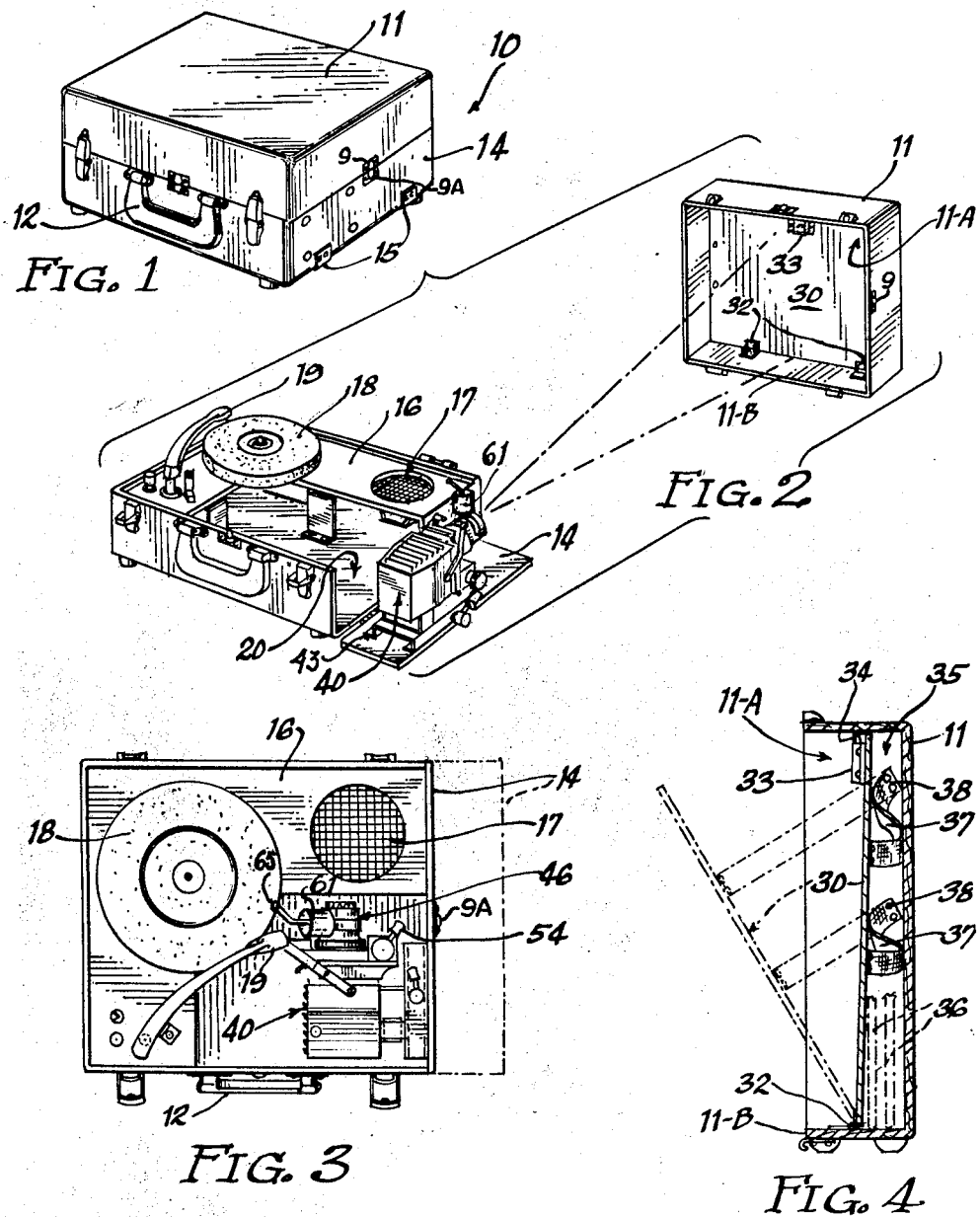
INVENTOR.
Floyd D. Parker
BY
Attorney

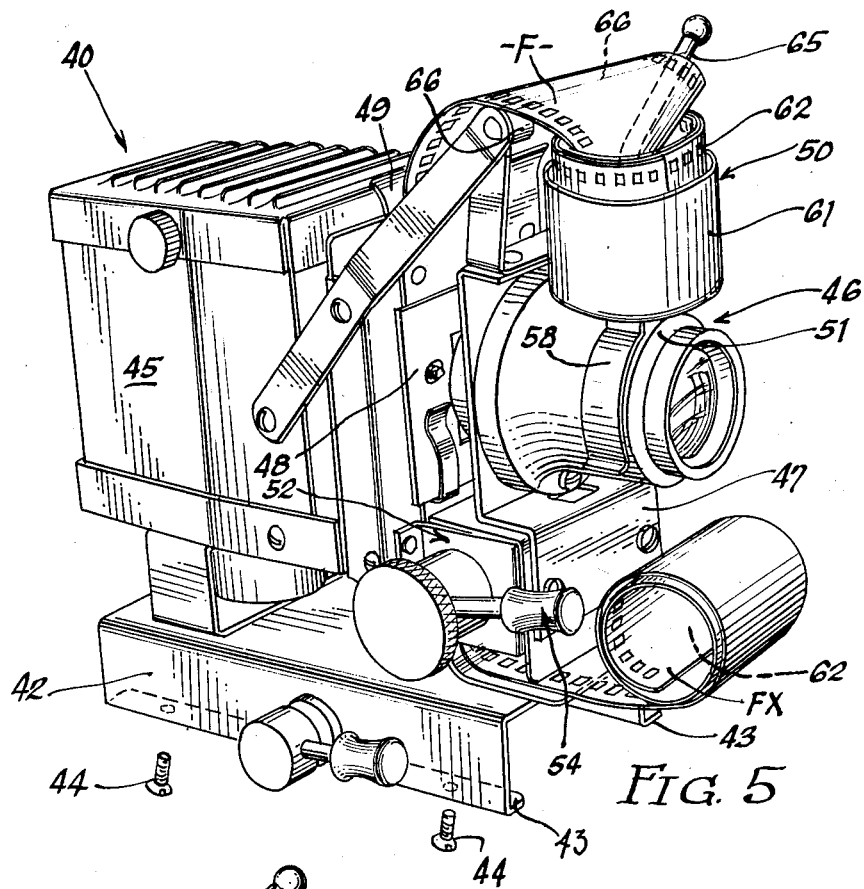

United States Patent Office 3,180,213
Patented Apr. 27, 1965

3,180,213
PORTABLE PROJECTION APPARATUS
Floyd D. Parker, Wilmette, Ill., assignor to McClure Projectors, Inc., Wilmette, Ill., a corporation of Illinois
Continuation of application Ser. No. 835,591, Aug. 24, 1959. This application Mar. 25, 1963, Ser. No. 269,233
5 Claims. (Cl. 88—28)

This application is a continuation of my pending application Serial No. 835,591 filed August 24, 1959, now abandoned.

The improvements disclosed relate to picture projection apparatus and have as their principal objects the provision of a portable projector including sound equipment for emission of speech or other sound effects to accompany the display of pictures by slide or film projection, such apparatus being particularly useful to salesmen, lecturers, engineers, and anyone having a demonstration or message to convey effectively by sound and pictures.

One of the important features of the described portable projector relates to the provision of a carrying case which contains the sound equipment and which has a hinged drop-wall to the inside face of which the projector base is attached in such manner that when the sidewall is dropped, so as to lie on the table or other surface upon which the bottom of the case is also supported, the projector will be in upright position in readiness to project pictures.

Another feature relates to the provision of an improved pivotal mounting of the picture screen on the inside of a fairly deep cover for the purpose of forming therebehind a compartment for phonograph records to be used with the sound equipment.

Still another feature relates to the provision of an improved feed bed for supporting a roll of film on the projector, the bed being both removable and rotatable so that the projector can occupy a minimized space in the case to be shared with the phonograph and amplifying equipment, and the film bed or holder will automatically turn out of the way on striking another object, such as a carelessly stowed power line cord or off-position sound pick-up arm situated in the case, when the drop side is folded up to stow the projector.

The disclosed construction has the great advantage that when the cover is removed the turntable is in readiness for immediate use and so is the projector, because removal of the top frees the drop-wall and the projector is then completely exposed on all sides and there are no cabinet parts to obstruct complete operative access thereto, and no need for any extended control rods or wall braces or the like to adjust or set, such as have characterized some prior devices.

Additional objects and aspects of novelty and utility relate to details of the operation and construction of the embodiment to be described hereinafter in view of the accompanying drawings, in which:

FIG. 1 is a perspective view of the projector case in closed condition;

FIG. 2 is a perspective view of the case opened and set up for projection;

FIG. 3 is a top plan view of the case with cover removed but projector folded into stowed condition;

FIG. 4 is a vertical section through the combination cover, screen, and record pocket structure;

FIG. 5 is an enlarged perspective detail of the projector removed from the case;

FIG. 6 is a cross-sectional view of the novel film feeding bed attachment;

FIG. 7 is a top plan view of the attachment shown in FIG. 6.

As viewed in FIG. 1, the projection means in fully stowed condition is contained within a portable hand case 10 of rectangular shape provided with a wholly separable lid 11, and a carrying handle 12. One sidewall 14 of the case is movable, being attached by hinge means 15 engaging the bottom of the main casing.

The projector in a preferred embodiment of the device is to be operated in conjunction with sound equipment of a known type also housed in the case, and including an amplifier (not seen) disposed beneath a panel 16 (FIGS. 2 and 3), a speaker (not seen) situated behind an opening 17, a record turntable 18, and a tone arm 19, these components being arranged to leave a compartment 20 adjacent the foldable- or drop-wall 14.

As depicted in FIG. 2, a small projector 40 of the type shown to larger scale in FIG. 5, is mounted on the inner face of the drop-wall 14 in a manner to fit snugly into the compartment 20 when this sidewall is pivoted into closed condition, as in FIG. 3, the projector being in a condition for operation when the drop-wall is folded down against a table top on which the case is rested, as illustrated in FIG. 2.

The cover 11, referring to FIGS. 2 and 4, is of box-like construction to provide a cavity 11A of substantial depth constituting a shadow box, and is provided with a rigid picture screen 30 situated about midway between the open side and the bottom of the cavity. The screen is pivotally attached by hinge means 32 to the inside of one of the sidewalls 11B of the cover (which constitutes the bottom of the box in projecting position (FIGS. 2 and 4).

Attached to the upper marginal portion of the outside face of the screen 30 is a spring latch 33 engageable with a catch 34 to releasably secure the screen in the closed condition shown in FIG. 4.

The median disposition of the screen 30 within the cover cavity leaves a pocket 35 therebehind large enough to accommodate several phonograph records, partially indicated at 36 by dotted lines, the same being insertable or removable by releasing the latch 33 and dropping the screen 30 into the dotted-line position shown in FIG. 4 to a limited open position determined by means such as flexible straps 37 attached thereto and anchored as at 38 on the inside of the lid. In the closed condition of the lid these straps relax into the record cavity, as shown in full lines.

The projector 40, as depicted in FIG. 5, comprises a channel-shaped base stamping 42 having offset flanges 43 adapted to fit upon the drop-wall 14 (FIG. 2) to which they are secured by suitable screw means 44 (FIG. 5) tapped into the flanges. Also mounted upon the channel base is a lamp housing 45 and a projection lens system 46 carried by a bracket 47 behind which is a slide holder 48, while on the rearward wall of the slide holder is a film track 49 into which the film F is fed from a special removable film bed or holding means 50, which clamps onto the lens barrel 51. The film strip is advanced in the usual step-by-step manner by sprocket means (not detailed) housed in a chamber 52 formed between the lens bracket and film track means, there being an advancing knob and lever 54 for actuating the feed sprocket means.

The lower outfeeding end of the film strip issues forwardly and will be self-wound into a roll 62 by its inherent curl or by use of a conventional guide means (not shown) rewinding in such manner that the beginning of the strip FX always lies on the inside of the rewound roll 62, which will be in readiness to be transferred back into the special film bed holder and fed from the inside out, as will presently appear.

Referring to FIG. 6, the snap-on film holder consists in a C-shaped spring clamp 58 of a diameter to spring into engagement with the lens barrel 51, there being an offset seat 59 at the bight to receive a nut 60 and also form a seat for the bottom wall of a film cup 61 into which the wound roll 62 of film may be deposited by dropping the same over an angled guide post 63 having a shoulder means 64 in the form of a stop nut on the inside of the cup and threading into the seated nut 60.

To thread the film for feeding into the film track the end FX of the strip lying on the inside of the roll is led up and over the angled arm 65 of the post and thence down into the track, as in FIG. 5, the post ensuring a smooth, easy payout as the strip is advanced by manipulation of the advancing sprocket lever 54.

Additional film-guiding roller means 66 lead the film downwardly into the track.

The snap-on film holder or bed may be removed entirely or turned appropriately on the lens barrel when the projector is stowed in a small case or folded back into the case, as in FIG. 3, on pushing up the drop-wall 14.

It will be observed that the hinge axis for the drop-wall 14 through hinge 15 extends in approximate parallelism with a plane containing the optical axis of the projector in both folded-in and projecting positions, and that the projector lies in a position to turn upwardly into overlying relation with said hinge axis and with a substantial part of its mass located inwardly of the cover beyond said axis, with the result that in stowed or folded condition it occupies an over-center relationship to the hinge axis by reason of which it does not tend to drop outwardly of its own accord on removal of the lid and resulting disengagement of the two interfitting catch members 9, 9A on the lid and drop-wall.

I claim:

1. In a picture projector particularly of the portable type having a cylindrical lens barrel and adapted to be stowed in a carrying case by pivotal movement about a fixed axis from a position outside of the case, the latter having a minimized space to accommodate the projector, which space is to be shared by cooperative equipment normally housed in the case, improvements in a film holder comprising, namely: a combination removable and automatically pivotable holder adapted to receive a roll of film and to pay out the same from the inside out into the film track of the said projector, said holder including a cup to contain a roll of film having an open core, a C-shaped spring clip attached to the bottom of the cup and of a diameter to fit upon and rotatably grip said lens barrel; said cup having a central post over which the core of the roll is loosely fitted, and said post having an angled arm constituting an outfeeding guide over which the film is fed out from the inside of said roll to the projector.

2. In a portable sound and picture projection unit, improved case structure comprising: a shallow rectangular case comprising a shallow bottom tray consisting of a bottom wall surrounded by low upstanding side walls consisting of opposite front and back wall sections with respectively contiguous opposite end wall sections, the height of which is the least dimension of the walls, one of said end wall sections constituting a drop side and being pivotally attached along its bottom margin to the contiguous end of said bottom wall such that said drop side can pivot from fully raised end-closing position down into a parallel plane with said bottom wall whereby the latter and the drop-wall can lie flush when the case is resting bottom down upon a flat table surface or the like; a picture projector having a base, a light housing and a lens barrel projecting therefrom and attached by its base to the inside face of said drop side and of such overall dimension as to turn back into the tray on pivoting the drop-wall into raised position with the major portion of the projector lying substantially within said tray; sound equipment sharing a predetermined space with said projector within said tray in an arrangement leaving a predetermined space for pivotal movement of the projector into and out of the tray and including a turntable device disposed normally in ready-to-use operative condition for ready access approximately at the top level of the tray; and a cover dimensioned to fit upon and close the open top of said tray and block movement of the projector out of the tray when in closing position, the optical axis of the projector extending substantially parallel to the pivotal axis of the drop side.

3. Apparatus according to claim 2 further characterized in that said lens barrel has a cylindrical length, and is provided with roll film containing means both removably and rotatably clamped in a radially-projecting position thereon to stand operatively upright for projection service by spring jaw means and rotative from operative position for angular clearance displacement to permit said projector to fold back into said tray on raising of the drop side whereby to conserve available space within the drop side by ability of the film containing means to pivot yieldingly responsive to impingement with any of said space-sharing equipment on movement into the tray.

4. Apparatus according to claim 3 further characterized in that said film containing means comprises a cup having a film-lead-out guide rod projecting outwardly through the top of the cup from the inside bottom thereof, and a pair of spring clip jaws projecting axially downward from the outside bottom thereof and adapted to yieldingly grasp said lens barrel to permit both angular displacement of the cup around the barrel axis and linear sliding of the cup on the barrel in the direction of said axis.

5. In a combination portable sound and picture projector, a rectangular carrying case having a depth which is its least dimension, and a bottom wall of greater area than any other wall so as to provide a relatively shallow case adapted to lie on its bottom wall on a supporting surface with a top opening facing upward from said bottom wall and defining a cavity housing sound apparatus including a turntable; a removable cover for the top opening, one of the side walls of the case being of shallow depth and hingedly connected to the bottom of the case to pivot from a normally raised position defining a closed drop-wall for said case and adapted in dropped condition to lie substantially flat on said surface along with said bottom wall; a picture projector mounted on the inner face of said side drop-wall with its optical axis extending in substantial parallelism with the general direction of the pivotal axis of said drop wall, said projector and said turntable lying wholly within the confines of the cavity of the case when the drop-wall is raised and the cover applied, and the turntable being arranged and constructed to be at all times in a condition for immediate use and operation to turn in a plane approximately parallel to that of said bottom wall.

References Cited by the Examiner

UNITED STATES PATENTS

| 1,624,156 | 4/27 | Brewster | 88—18.7 |
| 2,121,910 | 6/38 | Freimann. | |
| 2,127,590 | 8/38 | Erwood | 88—28 |
| 2,259,651 | 10/41 | McClure | 88—28 |
| 2,281,942 | 5/42 | Loughner et al. | 88—28 |
| 2,724,990 | 11/55 | Bennett | 88—28 |

OTHER REFERENCES

Page 4 of "Viewlex Projectors," a booklet 3¼ in. by 6¼ in., ten inside pages, designation "Form VE 8-58," printed on back cover page.

NORTON ANSHER, *Primary Examiner.*

EMIL G. ANDERSON, ROBERT L. EVANS,
*Examiners.*